US012617393B2

(12) United States Patent
Panigrahi et al.

(10) Patent No.: US 12,617,393 B2
(45) Date of Patent: May 5, 2026

(54) SYSTEM FOR DETECTING MOVING OBJECTS

(71) Applicant: Ford Global Technologies, LLC, Dearborn, MI (US)

(72) Inventors: Smruti Ranjan Panigrahi, Farmington Hills, MI (US); Erol Dogan Sumer, Ann Arbor, MI (US); Ehsan Arabi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 18/527,674

(22) Filed: Dec. 4, 2023

(65) Prior Publication Data

US 2025/0178596 A1    Jun. 5, 2025

(51) Int. Cl.
  *B60W 30/09* (2012.01)
  *B60W 50/00* (2006.01)
  *G01S 13/931* (2020.01)

(52) U.S. Cl.
  CPC ........ *B60W 30/09* (2013.01); *B60W 50/0097* (2013.01); *G01S 13/931* (2013.01); *B60W 2050/0052* (2013.01); *B60W 2420/408* (2024.01); *B60W 2554/80* (2020.02); *G01S 2013/9324* (2020.01); *G01S 2013/93275* (2020.01)

(58) Field of Classification Search
  CPC ............. B60W 30/09; B60W 50/0097; B60W 2050/0052; B60W 2420/408; B60W 2554/80; G01S 13/931; G01S 2013/9324; G01S 2013/93275
  See application file for complete search history.

(56) References Cited

U.S. PATENT DOCUMENTS

| | | | |
|---|---|---|---|
| 8,260,539 B2 | 9/2012 | Zeng | |
| 10,417,913 B2 * | 9/2019 | Panigrahi | B60R 21/0134 |
| 10,424,204 B1 * | 9/2019 | Han | G01S 13/931 |
| 10,875,483 B2 * | 12/2020 | De Silva | G06F 16/2237 |

(Continued)

FOREIGN PATENT DOCUMENTS

| | | |
|---|---|---|
| DE | 102008040038 B4 | 10/2019 |
| DE | 102019205008 B3 | 7/2020 |

OTHER PUBLICATIONS

L. Thomas et al. , "DSRC based collision warning for vehicles at intersections," 2016 3rd International Conference on Advanced Computing and Communication Systems (ICACCS), Coimbatore, India, 2016, pp. 1-5, doi: 10.1109/ICACCS.2016.7586321. (Year: 2016).*

(Continued)

*Primary Examiner* — Tarek Elarabi
(74) *Attorney, Agent, or Firm* — Frank A. MacKenzie; Brooks Kushman P.C.

(57) ABSTRACT

A computer that includes a processor and a memory, the memory including instructions executable by the processor to determine a location and a trajectory of a moving object with respect to a stationary vehicle based on one or more first stationary vehicle sensors. A threat level can be determined based on the location and the trajectory of the moving object, and a control barrier function. Based on the threat level, the stationary vehicle can be operated to move the stationary vehicle to reduce a probability of impact between the stationary vehicle and the moving object.

20 Claims, 9 Drawing Sheets

(56)                    References Cited

U.S. PATENT DOCUMENTS

| | | | | |
|---|---|---|---|---|
| 10,916,074 | B2 * | 2/2021 | Panigrahi | ............ G01M 17/013 |
| 10,919,475 | B2 * | 2/2021 | Panigrahi | ............ B60R 21/0136 |
| 11,787,441 | B2 * | 10/2023 | Rajanna | ................ G08G 1/148 |
| | | | | 701/301 |
| 12,139,168 | B2 * | 11/2024 | Rajanna | ................ G08G 1/164 |
| 2016/0034778 | A1 * | 2/2016 | Wang | ..................... G06T 7/277 |
| | | | | 382/105 |
| 2017/0120902 | A1 * | 5/2017 | Kentley | ............... B60W 10/18 |
| 2019/0080313 | A1 * | 3/2019 | Van Wiemeersch | ......................... |
| | | | | B60R 25/305 |
| 2019/0147744 | A1 * | 5/2019 | Grimm | ................ B60Q 5/006 |
| | | | | 701/301 |
| 2020/0223397 | A1 * | 7/2020 | Sakai | ..................... G06V 20/56 |
| 2020/0298406 | A1 * | 9/2020 | Griffiths | ................ A61B 34/37 |
| 2021/0065482 | A1 * | 3/2021 | Panigrahi | ................ G06N 3/08 |

OTHER PUBLICATIONS

"Most Advanced Automotive Radars," smartmicro, 2023, 15 pages.

* cited by examiner

500

510        512        508        502

504        110        506

600

SYSTEM FOR DETECTING MOVING OBJECTS

BACKGROUND

Computers can operate systems and/or devices including vehicles, robots, drones, and/or object tracking systems. Data including images can be acquired by sensors and processed by a computer to determine a location of a system with respect to objects in an environment around the system. A computer may use the location data to determine one or more trajectories of objects and/or the system or components thereof in the environment.

DETAILED DESCRIPTION

Figure 1:
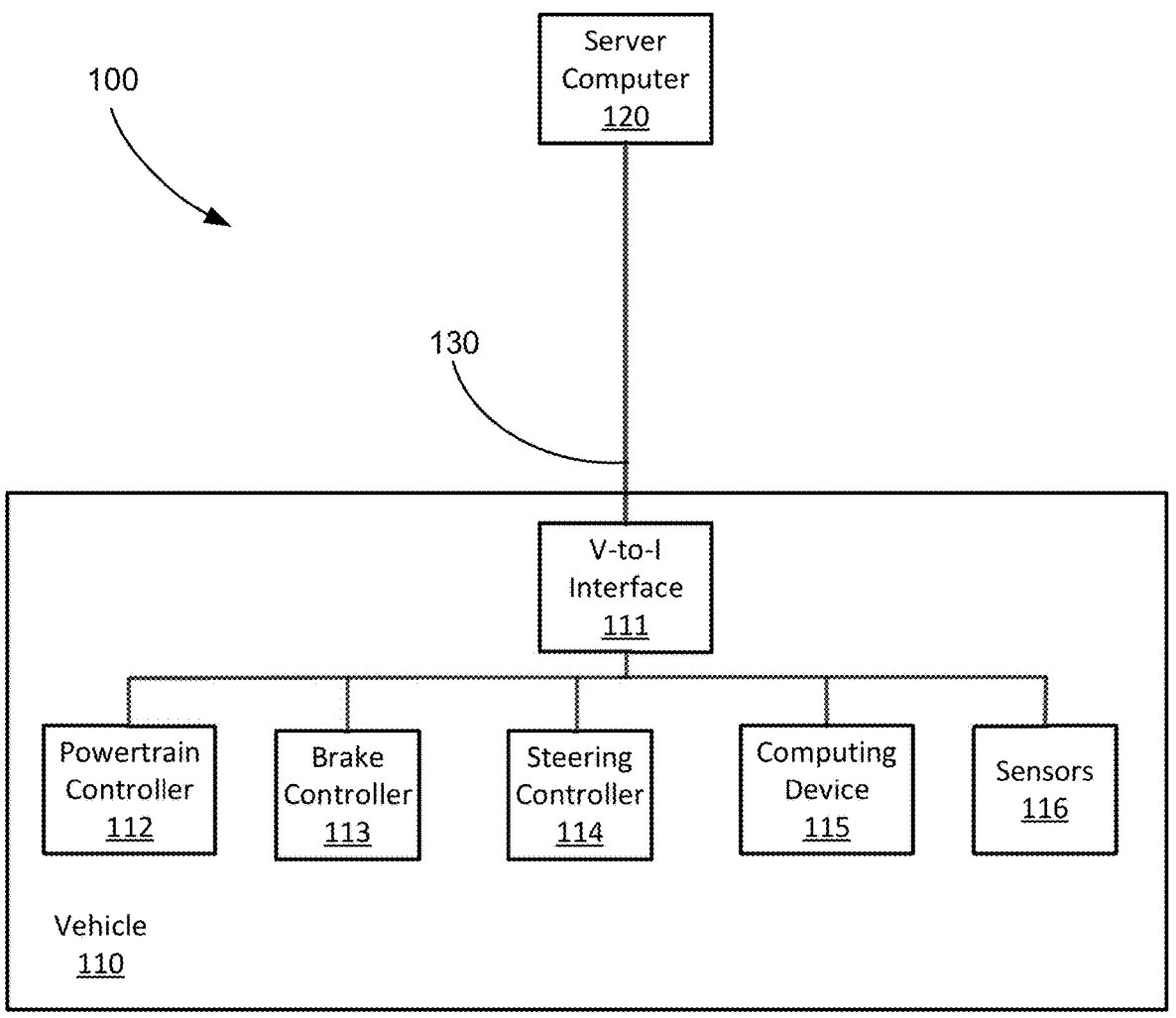
FIG. 1 is a block diagram of an example vehicle system.

Systems including vehicles, robots, drones, etc., can be operated by acquiring sensor data, including data regarding an environment around the system, and processing the sensor data to determine locations of objects in the environment around the system. The determined location data could be processed to determine operation of the system or portions of the system. For example, a robot could determine the location of another nearby robot's arm. The determined robot arm location could be used by the robot to determine a path upon which to move a gripper to grasp a workpiece while decreasing the probability of encountering the other robot's arm. In another example, a vehicle could determine a location of another vehicle traveling on a roadway. The vehicle could use the determined location of the other vehicle to determine a path upon which to operate while planning to maintain a predetermined distance from the other vehicle. Vehicle operation will be used as a non-limiting example of system location determination in description below.

In examples herein, a vehicle can be operated using light impact detection for pre-impact and post-impact vehicle control. Light impact detection herein means detection of a moving object in an environment around a vehicle, including a location and velocity of the moving object, and a determination that the moving object will likely impact the vehicle, and that the impact will likely occur at a relatively low speed. Light impact detection in examples assumes that the moving object is within 1 to 3 meters (m) of the vehicle and is moving at a low speed, e.g., a maximum of 1 to 3 meters/second (m/s). Techniques described herein enhance light impact detection typically by performing light impact detection while a vehicle is parked and/or unoccupied. Light impact detection described herein detects moving objects in a virtual sensing grid around a parked and/or unoccupied vehicle. The vehicle can then be operated to take evasive action to reduce a probability of impact. In examples where a vehicle cannot be operated to reduce the probability of impact, vehicle sensors can be operated to record data before, during and after the impact, including images of the moving object. The recorded data can provide a record of the impact, e.g., can be uploaded to a server computer or the like to inform users that an impact has occurred.

A virtual sensing grid herein means a radial pattern extending out from the vehicle upon which location and velocity data from moving objects can be placed. Virtual sensing refers to the light impact sensing system combining location and velocity data from two or more sensor types or modalities into a single data point on the virtual sensing grid. For example, a vehicle can include one or more optical sensors such as video cameras, one or more ultrasonic sensors, and/or one or more short range radar sensors. Respective ones of these sensors, following acquisition and processing by a computer included in the vehicle, can produce location and velocity data regarding moving objects. Combining data from two or more sensors can enhance accuracy, resolution, and reliability of acquired moving object data.

A computer 115 as described herein can determine a threat level by comparing a moving object's location and trajectory to a control barrier function which determines distances around a stationary vehicle. Threat levels in the context of this description correspond to respective probabilities or ranges of probabilities of an impact, and in one example can include "idle," which includes no probability of impact, "aware," which include a low probability of impact (e.g., less than 10% probability), "warning," which includes a moderate probability of impact (e.g., between 10% and 90%), and "evade" which includes a high probability of impact (e.g., greater than 90%) between the stationary vehicle and a moving object. Determining threat levels based on probabilities of impact is described in relation to FIGS. 5-7, below.

The present system can attempt to reduce the probability of impact with a moving object by alerting the moving object that an impact may be imminent by flashing vehicle lights and/or sounding a vehicle horn or other sound emitting device. The vehicle can also prepare for possible impact by examining the environment around the vehicle to determine distances to objects including other vehicles and structures such as walls, columns, signage, etc. The vehicle can attempt to reduce the probability of impact by determining possible directions and distances in which the vehicle can move to reduce the probability of impact without impacting another vehicle or other structure. When a determined probability of impact exceeds a predetermined threshold, for example 90% or higher, a computer in the vehicle can command vehicle propulsion, steering and brakes to operate the vehicle to move the vehicle and reduce the probability of an impact.

Disclosed herein is a method including determining a location and a trajectory of a moving object with respect to a stationary vehicle based on one or more first stationary vehicle sensors, determining a threat level based on the location and the trajectory of the moving object, and a control barrier function and based on the threat level, operating the stationary vehicle to move the stationary vehicle to reduce the probability of impact between the stationary vehicle and the moving object. A probability of impact can be determined based on the control barrier function, the location of the moving object and the trajectory of the moving object. The threat level can include an idle state, an aware state, a warning state, and an evade state, wherein the idle state includes no probability of impact, the aware state includes a low probability of impact, the warning state includes a moderate probability of impact and the evade state includes a high probability of impact. The stationary vehicle can be one or more of parked, in a key-off state, and unoccupied. The stationary vehicle can be operated by controlling one or more of vehicle propulsion, vehicle steering, and vehicle brakes.

First stationary vehicle sensor data can be acquired periodically and combining the first stationary vehicle sensors into a virtual sensor grid. The trajectory of the moving object can be determined using a Kalman filter based on determining two or more locations of the moving object. Second stationary vehicle sensors can be activated based on the threat level. A location of impact on the stationary vehicle can be determined based on the control barrier function. One or more lights included in the stationary vehicle can be activated based on the threat level. One or more of flashing a vehicle light and sounding a vehicle horn can be performed based on the threat level. An evasive distance around the stationary vehicle can be determined within which to operate the stationary vehicle to reduce the probability of impact without impacting an object in an environment around the stationary vehicle. The moving object can be a second vehicle. The evasive distance can be based on detecting distances to objects in an environment around the stationary vehicle.

Further disclosed is a computer readable medium, storing program instructions for executing some or all of the above method steps. Further disclosed is a computer programmed for executing some or all of the above method steps, including a computer apparatus, programmed to determine a location and a trajectory of a moving object with respect to a stationary vehicle based on one or more first stationary vehicle sensors, determine a threat level based on the location and the trajectory of the moving object, and a control barrier function and based on the threat level, operate the stationary vehicle to move the stationary vehicle to reduce a probability of impact between the stationary vehicle and the moving object. A probability of impact can be determined based on the control barrier function, the location of the moving object and the trajectory of the moving object. The threat level can include an idle state, an aware state, a warning state, and an evade state, wherein idle state includes no probability of impact, the aware state includes a low probability of impact, the warning state includes a moderate probability of impact and the evade state includes a high probability of impact. The stationary vehicle can be one or more of parked, in a key-off state, and unoccupied. The stationary vehicle can be operated by controlling one or more of vehicle propulsion, vehicle steering, and vehicle brakes.

The instructions can include further instructions to acquire first stationary vehicle sensor data periodically and combine the first stationary vehicle sensors into a virtual sensor grid. The trajectory of the moving object can be determined using a Kalman filter based on determining two or more locations of the moving object. Second stationary vehicle sensors can be activated based on the threat level. A location of impact on the stationary vehicle can be determined based on the control barrier function. One or more lights included in the stationary vehicle can be activated based on the threat level. One or more of flashing a vehicle light and sounding a vehicle horn can be performed based on the threat level. An evasive distance around the stationary vehicle can be determined within which to operate the stationary vehicle to reduce a probability of impact without increasing a probability of impacting an object in an environment around the stationary vehicle. The moving object can be a second vehicle. The evasive distance can be based on detecting distances to objects in an environment around the stationary vehicle.

FIG. 1 is a diagram of a vehicle computing system 100. Vehicle computing system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate vehicle 110 based on data received from the sensors 116 and/or data received from the remote server computer 120. The server computer 120 can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a propulsion controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in vehicle 110 and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2I) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2I) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/or operations. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a propulsion controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more propulsion controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110.

The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. Vehicle 110 includes one or more sensors 116, the V2I interface 111, the computing device 115 and one or more controllers 112, 113, 114. Sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2I interface 111 and computing device 115, and therefore these features will not be described further to reduce redundancy. A server computer 120 can be used to develop and train software that can be transmitted to a computing device 115 in a vehicle 110.

Figure 2:
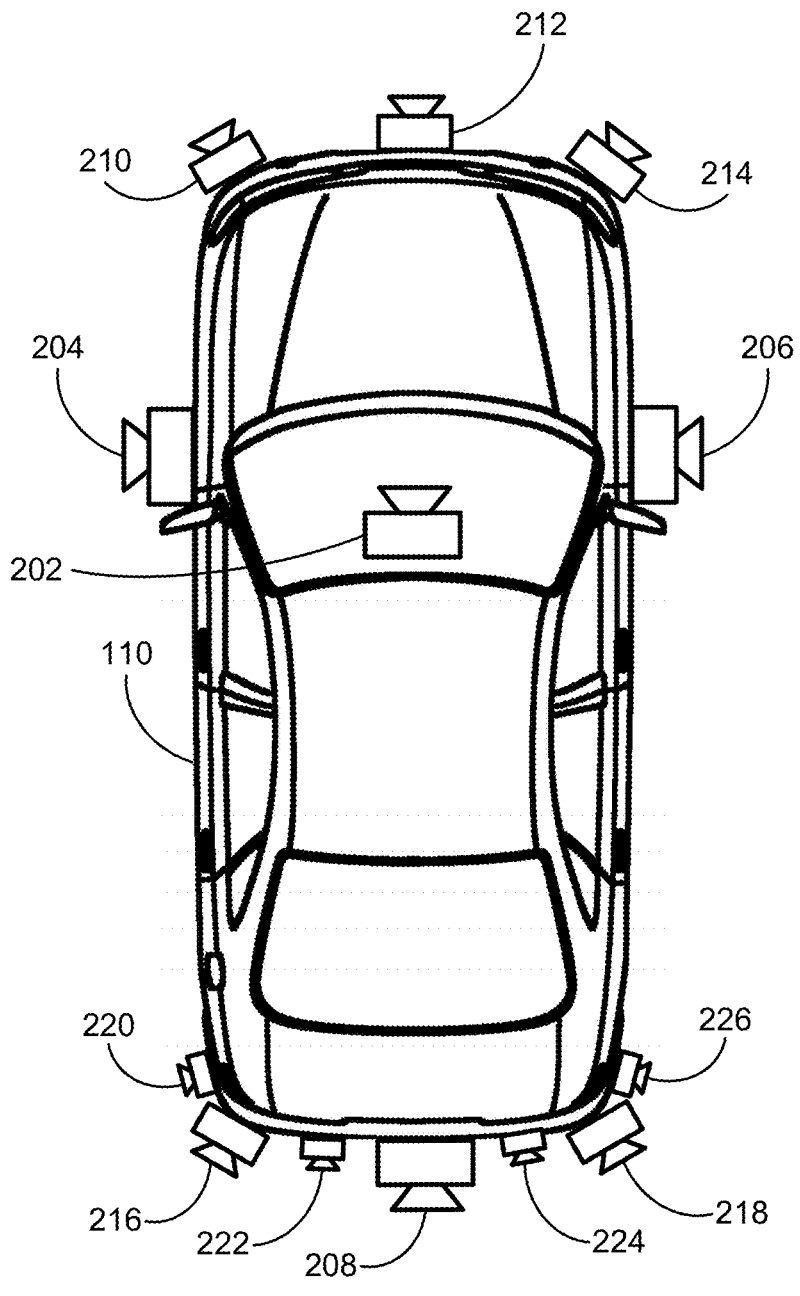
FIG. 2 is a diagram of an example vehicle including sensors.

FIG. 2 is a diagram of an example vehicle 110. Vehicle 110 includes multiple sensors 116, including a front view camera 202, surround view cameras 204, 206, and a rear view camera 208. Vehicle sensors 116 also include medium range radar sensors 210, 212, 214, short range radar sensors 216, 218 and ultrasonic sensors 220, 222, 224, 226. Front view camera 202, surround view cameras 204, 206, and rear view camera 208 can be video cameras that acquire color or grayscale images that are transmitted to a computing device 115 included in vehicle 110. The computing device 115 can receive the images and process them to determine locations of moving objects in the environment around the vehicle. For example, a suitable deep neural network (DNN) can be trained to detect, label and locate objects. Based on data regarding three dimensional (3D) poses of the cameras 202, 204, 206, 208 with respect to the vehicle 110, a location of a ground plane assumed to be parallel to a roadway that supports the vehicle 110, and intrinsic camera data including camera focal distance and sensor scale, a deep neural network can determine a location of an object with respect to a vehicle 110 in an image. By tracking locations of objects in multiple images a trajectory, which includes location and velocity (speed, and direction), can be determined.

Data from medium range radar sensors 210, 212, 214 and short range radar sensors 216, 218 can be acquired by computing device 115. Radar sensors emit microwave energy and acquire reflected energy to determine distance and direction to objects in an environment directly. Computing device 115 can filter the radar data to suppress noise and enhance distance resolution by averaging multiple returns. In addition, Doppler radar can return velocity in the direction of the radar receiver. Combining Doppler returns with multiple locations over time can permit computing device 115 to determine a trajectory for objects in radar data. Similar to radar, ultrasonic sensors 220, 222, 224, 226, emit pulses of ultrasonic energy and acquire reflected energy to determine distance and directions to objects in an environment around a vehicle.

Figure 3:
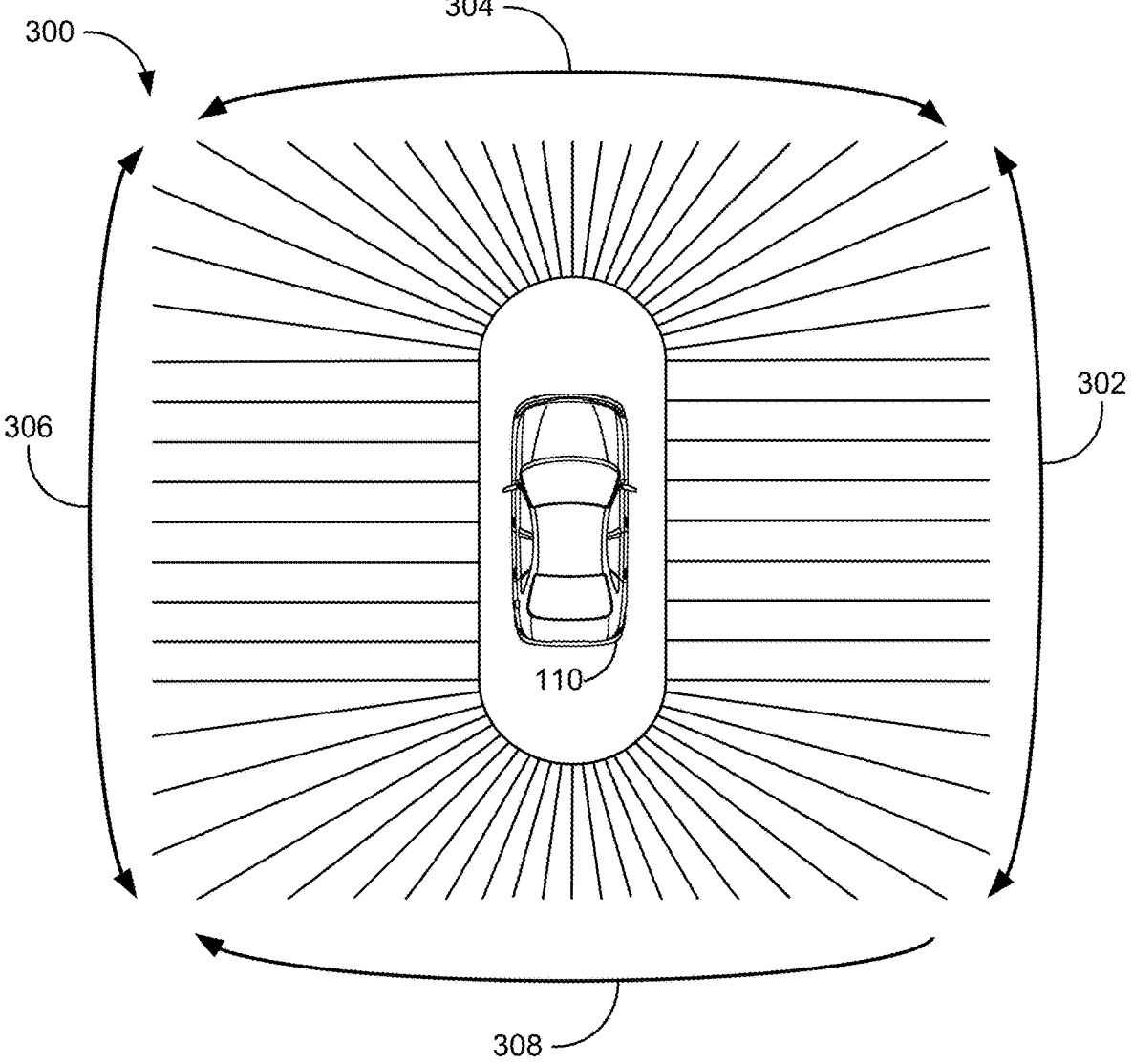
FIG. 3 is a diagram of an example vehicle virtual sensing grid.

FIG. 3 is a diagram of a virtual sensing grid 300. Virtual sensing grid 300 is formed in the vicinity of vehicle 110. Virtual sensing grid 300 can be divided into a plurality of regions, e.g., 64 regions, disposed around vehicle 110. The number of regions can vary depending upon one or more attributes of objects to be detected and a selected maximum distance at which objects are to be detected. For example, if a person is the smallest object to be detected by a computing device 115 acquiring data from sensors 116, the size of a person at the maximum selected distance can be used to select the size of a region. Dividing a perimeter of the virtual sensing grid 300 by the size of a person at a maximum range, for example three meters, yields the number of regions, for example 64. The 64 regions can be divided into four sectors: right 302, front 304, left 306 and rear 308. Dividing the grid 300 into regions, e.g., 64 regions, can reduce computational complexity that would result from a single region, or from less than a selected number of regions, while maintaining enough resolution to provide usable results. When sensors 116 detect an object within a predetermined distance from vehicle 110, for example three meters, a data point can be inserted into the virtual sensing grid 300 at the detected distance from vehicle 110. The predetermined distance can be determined based on a distance at which the sensor with the least range can reliably detect an object, e.g., as indicated in manufacturer specifications and/or empirical testing, and may be dependent on environmental conditions, such as ambient light, fog, etc. In an example the sensors with the least range of vehicle sensors 116 could be ultrasonic sensors 220, 222, 224, 226, which can reliably detect objects at no more than three meters. In examples where more than one data point is detected for a given region, only the data point closest to vehicle 110 is included in the virtual sensing grid 300 to represent an object.

Figure 4:
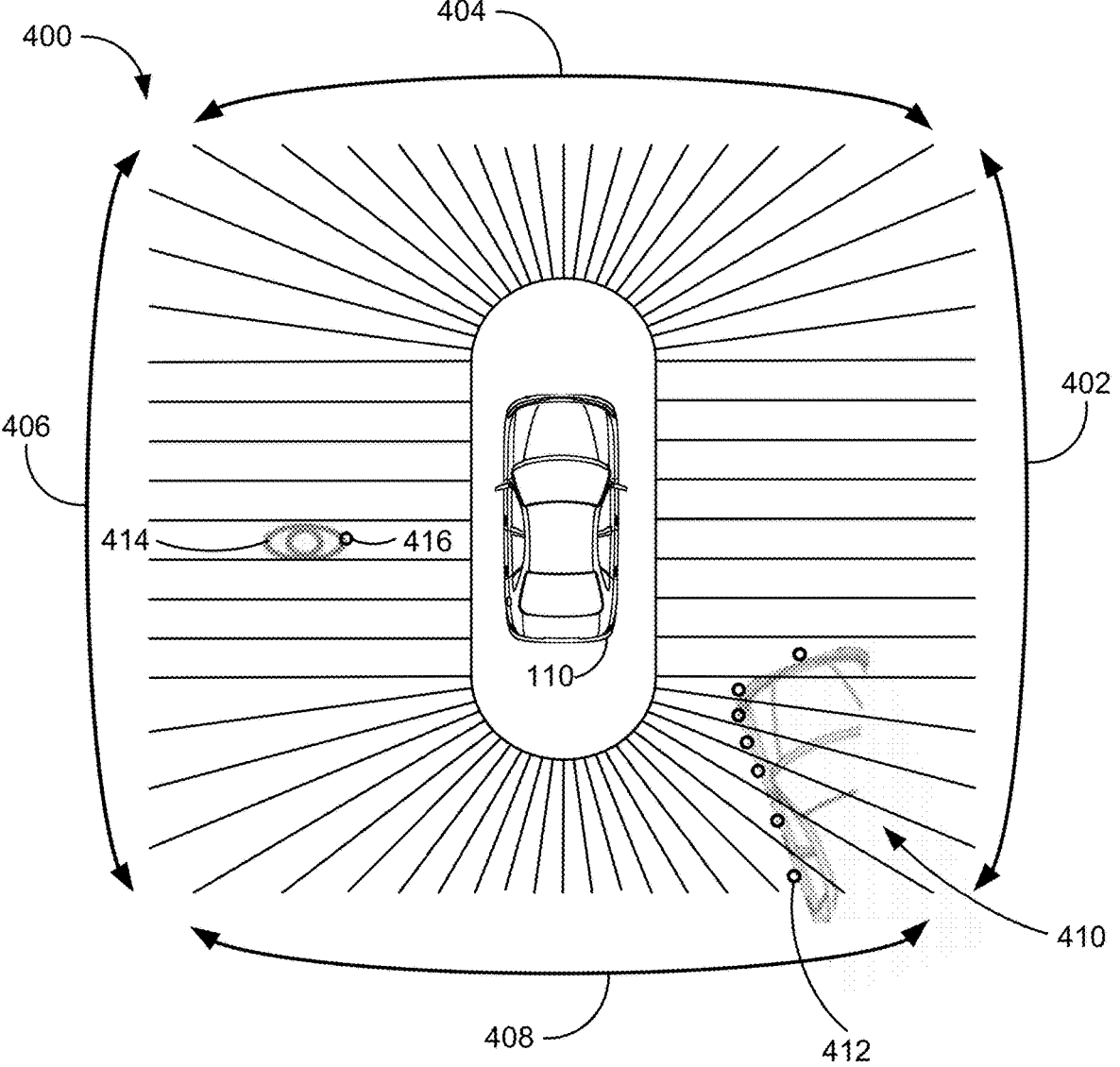
FIG. 4 is a diagram of an example vehicle virtual sensing grid including objects.

FIG. 4 is a diagram of a virtual sensing grid 400 formed in the vicinity of vehicle 110. Virtual sensing grid 400 includes 64 regions divided into right 402, front 404, left 406 and rear 408 sectors. Virtual sensing grid 400 includes two objects 410, 414. Object 410 is a vehicle and includes seven data points 412 acquired by sensors 116 included in vehicle 110 as described in relation to FIG. 2, above. The seven data points 412 are divided into two data points the rear 408 sector and five data points in the right 402 sector. A computer 115, programmed for light impact detection as described herein, can determine that a minimum number of data points be present in a sector to be detected as an object, for example two. In this example, a computer 115 would detect an object 410 indicated by data points 412 in both right 402 sector and rear 408 sector.

Sensors 116 in vehicle 110 could also detect a single data point 416 indicated by object 414 in the left 406 sector. In this example, object 414 could be a person. In this example computer 115 programmed for light impact detection would not insert a data point into virtual sensing grid 400 indicating an object 414 indicated by a single data point 416 in a sector. In some examples, a computer 115 programmed for light impact detection can be programmed to detect an object indicated by a single data point 416 in a sector. For example, an object 414 indicated by a single data point 416 in a sector can be tracked by a computer 115 programed for light impact detection to determine whether the object 414 is on a trajectory to contact or impact vehicle 110. This could indicate a person trying to cause mischief, such as trying to enter vehicle 110 or an object such as a loose shopping cart potentially causing a scratch on the exterior of vehicle 110. In either case, evasive action is likely not warranted, but video footage of the incident may be recorded and forwarded to a user.

Figure 5:
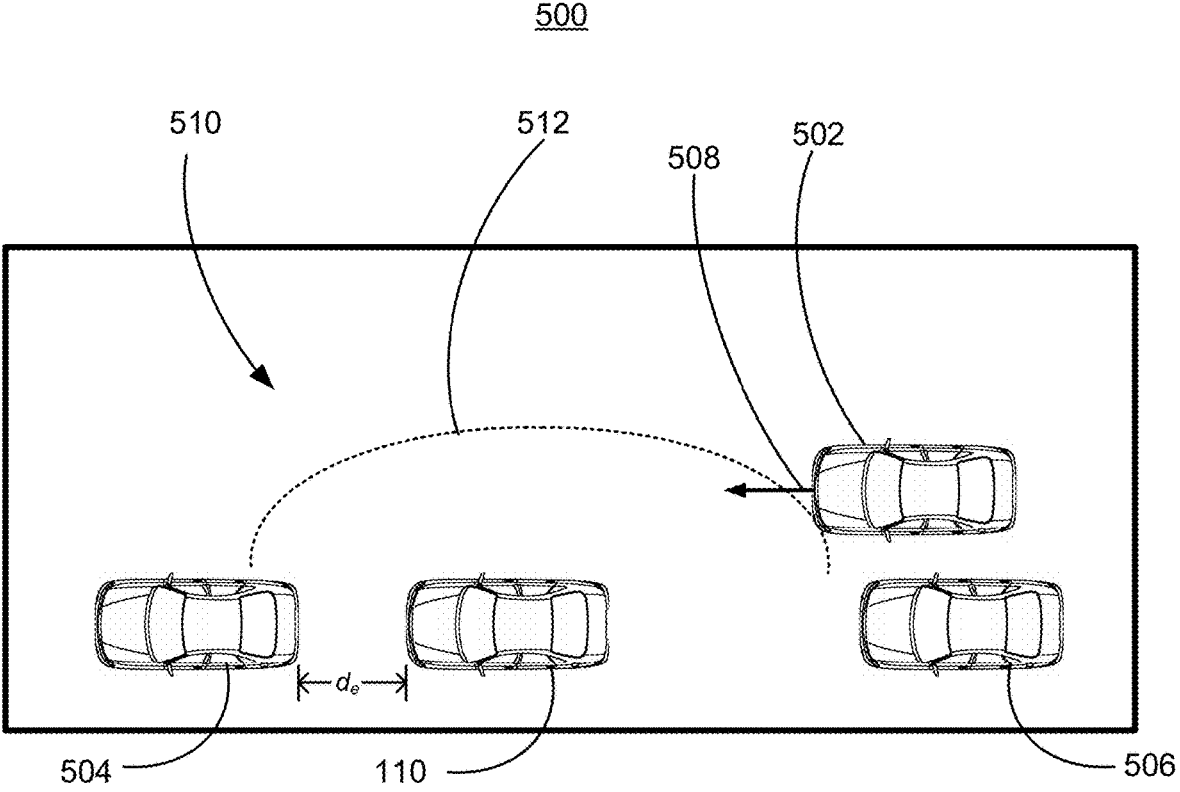
FIG. 5 is a diagram of an example traffic scene.

FIG. 5 is a diagram of a traffic scene 500. Traffic scene includes vehicles 110, 504, 506 parallel parked on a roadway 510. Vehicle 502 can be traveling on roadway 510, for example. Vehicle 110 includes a computing device 115 included in vehicle 110, including programming for light impact detection as described herein. While vehicle 110 is stationary (parked) and/or unoccupied, possibly in a "key off" state, e.g., the vehicle 110 is turned off, the computer 115 can maintain vehicle 110 in "standby" state, where a subset of vehicle sensors 116 can be activated. In standby state, a subset of vehicle sensors 116 can be activated periodically, e.g., once every second or once every two or three seconds to minimize power drain on vehicle batteries.

The subset of vehicle sensors 116 can include one or more ultrasound sensors 220, 222, 224, 226, and one or more cameras 202, 204, 206, 208. As described above in relation to FIG. 2, the ultrasound sensors 220, 222, 224, 226 can directly return a distance and a location for an object with respect to vehicle 110. Cameras 202, 204, 206, 208 can require image data acquisition by a computing device 115 included in vehicle 110 to determine a location of vehicle 502 with respect to vehicle 110. The computer 115 can insert the vehicle 502 location and size data into a virtual sensing grid 400. As described above in relation to FIG. 2, a technique for determining a location for an object in image data can include processing the image data with a deep neural network.

A suitable type of deep neural network to process image data to determine a location for objects includes a convolutional neural network. A convolutional neural network includes convolutional layers and fully connected layers. Convolutional layers can receive image data as input and convolve the image data with convolutional kernels to extract features from the image data. Extracted features are passed to fully connected layers to identify and locate the features by determining linear and non-linear functions on the features. The operations performed by convolutional kernels and linear and non-linear functions are specified by weights determined by training the convolutional neural network based on a training dataset of images and ground truth data that specifies the results expected from processing the images in the training dataset with the convolutional neural network.

A convolutional neural network can be trained by inputting the images from a training dataset that typically includes thousands of images. Each image is processed multiple times, with the results of each processing pass compared with the ground truth data to determine a loss function. The loss function measures how well the result matches the ground truth data. At each pass, the weights that determine the operations performed by the convolutional neural network are changed and the resulting effect on the loss function determined. The loss function is back propagated through the convolutional neural network from output layers to input layers to adjust the weights to minimize the loss function. A set of weights that result in minimal loss functions over the training data set are selected as the weights included in the trained convolutional neural network.

A computer 115 can identify moving objects by determining the number of adjacent regions on a virtual sensing grid 400 occupied by the moving object or by identifying moving objects using a convolutional neural network. A computer 115 can sort identified moving objects in to two groups: vehicles and non-vehicles. The non-vehicle group can include pedestrians and bicycles, for example. A computer 115 can be programmed to track and respond to vehicles and ignore non-vehicles, for example.

Returning to FIG. 5, a computer 115 executing on computing device 115 in standby state can acquire sensor data from sensors 116 included in vehicle 110 to determine a location for a moving object, in this example vehicle 502 at a single time step. Sensor data from sensors 116 can be acquired at multiple time steps and received by computing device 115 to determine multiple locations for vehicle 502 at multiple time steps and used to determine a trajectory 508 for vehicle 502. A trajectory 508 for vehicle 502 that includes location, speed, and direction can be determined for vehicle 502 at various time steps as it moves in traffic scene 500. By acquiring location data for vehicle 502 at multiple time steps, trajectories 508 for vehicle 502 can be determined that describe the motion of vehicle 502 in traffic scene 500 and that can be used to predict future locations for vehicle 502. A technique for determining a trajectory 508 for vehicle 502 can be processing multiple locations with a Kalman filter. A Kalman filter is a technique for fitting a function to acquired data points that filters out noise and determines a smooth function from possibly noisy data points.

A computer 115 executing on computing device 115 can include a control barrier function h. Control barrier function h can be provided for determining a probability of impact for moving objects in an environment around vehicle 110. In traffic scene 500, a computing device 115 in vehicle 110 has determined a trajectory 508 for vehicle 502 as described above in relation to FIG. 5, above. Computing device 115 in vehicle 110 can determine a control barrier function h that determines a control barrier such as a first example control barrier 512 around vehicle 110. An exemplary control barrier function h is be specified by the equation:

$$h = y^T - d_{y,min} + c_b x_T^2 \qquad (1)$$

Where $y^T$ is the lateral distance of the target vehicle, in this example vehicle 502, perpendicular to the direction of travel of vehicle 110, $d_{y,min}$ is the minimum distance permissible when vehicle 110 and vehicle 502 are side-by-side, $c_b$ is a coefficient that determines the curvature of a line specified by the first control barrier 512 with respect to vehicle 110 and $$x_T^2$$

is the square of the longitudinal distance, parallel to the direction of travel of vehicle 110, of the target vehicle from vehicle 110.

When the computer 115 detects an approaching object, such as vehicle 502, the computer 115 can compare the determined location and trajectory of vehicle 502 to a first control barrier 512. When a location of a moving object such as vehicle 502 reaches first control barrier 512, the trajectory 508 of the vehicle 502 can be tested to determine whether the vehicle 502 is traveling in a direction that would have a very low probability of impact with vehicle 110 if the trajectory 508 was not altered. If the location of vehicle 502 reaches first control barrier 512 and trajectory 508 is in a direction that would have a very low probability of impact with vehicle 110, the computer 115 can transition from the standby state to an "aware" state.

In the aware state, the probability of impact with vehicle 110 is low, however, computer 115 can increase surveillance of vehicle 502 in case trajectory 508 changes. To increase surveillance, the light impact detections system can activate additional sensors 116 including ultrasonic sensors 220, 222, 224, 226, cameras 202, 204, 206, 208, and radar sensors 210, 212, 214, 216, 218. Computer 115 can also increase the rate at which sensors 116 acquire object location data to facilitate light impact detection. Acquiring object location data at multiple time steps permits the computer 115 to determine a trajectory for a moving object.

In an aware state, a computer 115 has detected a moving object, in this example vehicle 502, in an environment around a vehicle and is determining and updating trajectories 508 for the vehicle 502. Based on the location of vehicle 502 in the virtual sensing grid 400 and the determined trajectory 508, the aware state indicates that computer 115 has determined that the vehicle 502 has a low probability (e.g., <10%) of impacting vehicle 110. The probability of impact is based on the location and trajectory 508 of vehicle 502 with respect to vehicle 110 and can be determined based on projecting the location of vehicle 502 into the future along the determined trajectory 508. A future location of vehicle 502 can be determined by any suitable technique for predicting a future location according to a trajectory, e.g., selecting a time period and updating the vehicle 502 location according to the speed and direction indicated by trajectory 508 and the selected time period.

In an aware state, a computer 115 can prepare to evade impact with an approaching vehicle 502, even though the probability of impact is low. The computer 115 can power on vehicle propulsion, steering and brakes to enable vehicle 110 to respond if required. Vehicle lights can be turned on and additional cameras can be activated to record image data regarding vehicle 502 including license plate numbers, for example. The computer 115 can also determine an evasive distance $d_e$, which is the distance within which vehicle 110 can perform an evasive action without contacting another object.

Evasive distance $d_e$ can be determined by detecting distances to objects in the environment around vehicle 110 in a direction that vehicle 110 would move to evade a possible impact with an oncoming object such as vehicle 502. Evasive distance $d_e$ can be determined by determining future locations for vehicle 110 in a direction that evades contact with an oncoming object while maintaining a selected minimum distance from detected stationary objects around vehicle 110. The stationary objects include objects such as a parked vehicle 504 or other stationary objects such as curbs or pillars, for example. Evasive distance $d_e$ can also depend upon the trajectory of oncoming objects such as vehicle 502, and the ability of vehicle 110 to accelerate and brake. The direction in which evasive distance $d_e$ can be a function of maximum free space before encountering a minimum distance from stationary objects and maximum ability to evade impact with a moving object based on the object's trajectory. Evasive distance $d_e$ can be determined empirically and stored in tables, for example. The computer 115 can also prepare for evasive action by steering the wheels in the direction in which evasive action will be taken and can turn on vehicle lights to warn vehicle 502.

Figure 6:
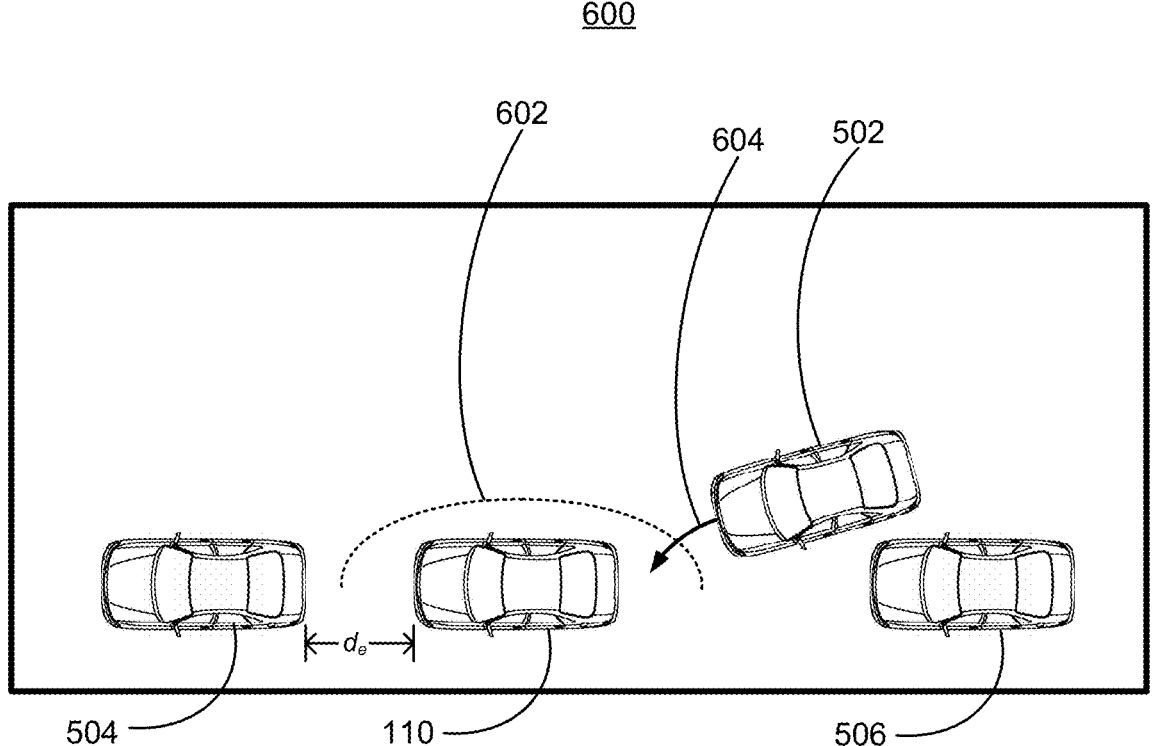
FIG. 6 is a diagram of another example traffic scene.

FIG. 6 is a diagram of a traffic scene 600 including a second example control barrier 602. The second control barrier 602 is determined by equation (1) as described in relation to FIG. 5 above to be closer to vehicle 110 than to first example control barrier 512 in FIG. 5. When the location of vehicle 502 is on or past the location of the second control barrier 602 and trajectory 602 indicates that vehicle 502 is headed towards vehicle 110, computer 115 executing on computing device 115 can transition from an aware state to a warning state. The warning state indicates that a moderate probability exists that vehicle 502 can impact vehicle 110. For example, moderate probability of impact includes probabilities between 10% and 90%. Determination of the probability of impact can be based on the location of vehicle 502 with respect to second control barrier 602 and the direction, and speed of vehicle 502 based on trajectory 604. The more directly the trajectory 602 intersects with vehicle 110 and the higher the speed of vehicle 502, higher lateral (steering) and longitudinal (braking) accelerations would be required to evade possible impact which increase the probability of impact. The probability of impact can be proportional to the lateral and longitudinal accelerations required to evade impact. While vehicle 110 is in a warning status with a moderate probability of impact, the computer 115 can maintain vehicle propulsion, steering, and brakes for possible actuation, e.g., power up vehicle systems and continue to determine an evasive trajectory for vehicle 502.

Figure 7:
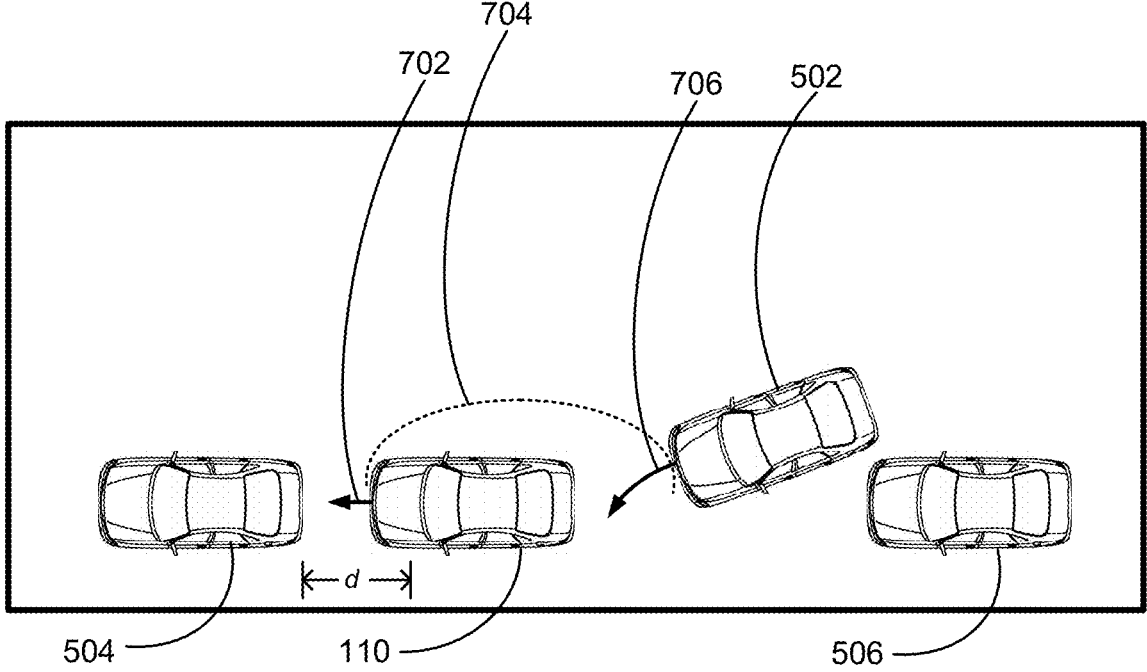
FIG. 7 is a diagram of a further example traffic scene.

FIG. 7 is a diagram of a traffic scene 600 including a third example control barrier 704. When computer 115 is in a warning state and vehicle 502 reaches the third control barrier 704 and trajectory 706 of vehicle 502 indicates that there is a high probability of impact (e.g., >90%) between vehicle 502 and vehicle 110, computer 115 can transition to an "evade" state. A high probability of impact is typically specified where the direction and speed of vehicle 502 indicate that no obtainable steering or braking by vehicle 502 will likely evade impact. In evade state, the computer 115 can flash vehicle lights, sound vehicle horn, or perform other audible warnings, and control one or more of vehicle propulsion, steering and brakes to take evasive action. When computer 115 is in evade state, and an evasive distance $d_e$ exists that would permit vehicle 110 to take evasive action, computer 115 can command computing device 115 to control vehicle propulsion, steering, and brakes via controllers 112, 113, 114 to operate vehicle 110 to move vehicle 110 as indicated by arrow 702 away from vehicle 502 into the evasive distance $d_e$ to reduce a probability of impact between vehicle 502 and vehicle 110. Note that vehicle 110 in the present example is being operated while in a key-off state without any user input.

In some examples computer 115 may be unable to reduce a probability of or minimize impact by a moving object, for example where a side-swipe impact occurs and operating vehicle 110 cannot move to likely evade the impact. In either example, whether computer 115 can computing device 115 can record video, audio and other data regarding the location and severity of impact, transmit the data to server computer 120 via network 130 to document the impact for users. In examples where vehicle-to-vehicle communication is available via local area networking, a signal can be transmitted from a computing device 115 in vehicle 110 to a computing device 115 in vehicle 502 to communicate the predicted impact to permit vehicle 502 to try to reduce a probability of impact.

Figure 8:
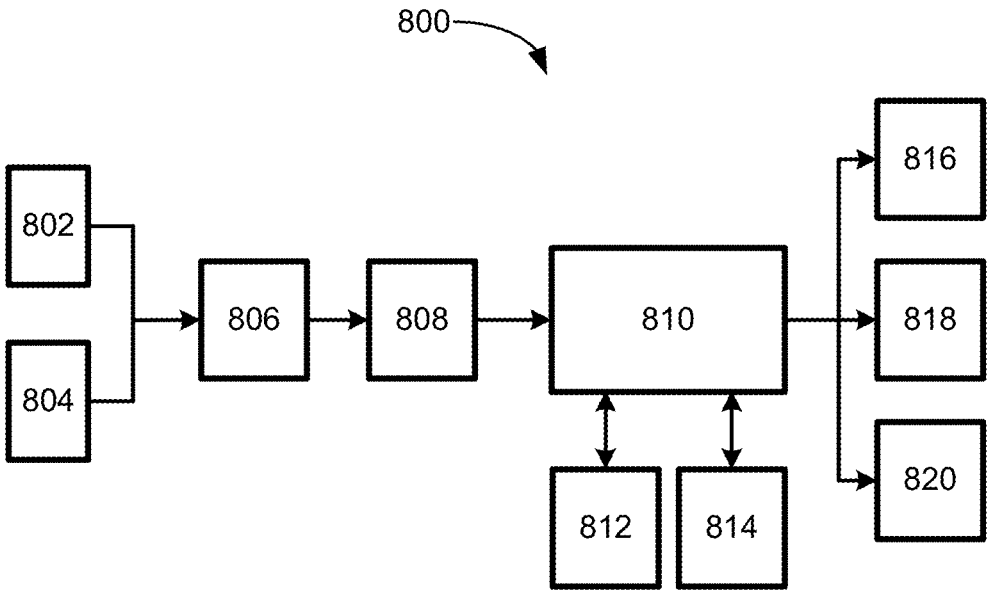
FIG. 8 is a diagram of an example vehicle impact detection system.

FIG. 8 is a block diagram of a light impact detection implementation 800 for a vehicle. Computer 115 800 receives as input data from sensors 802 and telecommunications control unit (TCU) 804, which can be a conventional ECU in a vehicle that provides telematics or telecommunications data and/or control. Sensors 802 include front view camera 202, surround view cameras 204, 206, rear view camera 208, medium range radar 210, 212, 214, short range radar 216, 218, and/or ultrasonic sensors 220, 222, 224, 226 as described in relation to FIG. 2, above. TCU 804 can include data from GPS, inertial measurement unit (IMU), and downloaded data including map data. Data from sensors 802 and TCU 804 are received by local environment model 806 which constructs a virtual sensing grid 400 as described in relation to FIGS. 3 and 4, above. Sensor data, TCU data, and a virtual sensing grid 400 is output by local environment model 806 to perception interface 808 which can identify moving objects and determine trajectories.

Sensor data, TCU data, virtual sensing grid 400 identified moving objects and determined trajectories are output to threat manager 810. Threat manager 810 determines the current threat level as being idle, aware, warning, or evade as described in relation to FIGS. 5, 6, and 7, above. Threat manager 810 determines the current threat level based on control barriers 512, 602, 704 determined by control barrier function 812 and trajectories including locations of moving objects. The control barriers 512, 602, 704 indicate distances from vehicle 110 at which trajectories of moving objects are evaluated to determine probabilities of impact with vehicle 110. Threat manager 810 can determine potential evasive actions based on control function 814, Control function 814 determines an evasive action as described above in relation to FIG. 7 that includes a vehicle path which directs vehicle 110 to move vehicle 110 away from a potential impact with a moving object while evading other objects by staying within an evasive distance $d_e$ that maintains a minimum distance from other stationary objects. The vehicle path is a trajectory that can be analyzed by control function 814 to yield commands to vehicle propulsion, steering, and brakes to move vehicle 110 along the determined vehicle path.

An evasive action can include actuating vehicle propulsion, steering and/or brakes; a computer 115 can determine commands to operate vehicle 110 to take evasive action based on evasive distance $d_e$ determined by threat manager 810. The commands to vehicle propulsion, steering, and brakes can be determined that move a vehicle 110 along a vehicle path while maintaining minimum and maximum limits on lateral and longitudinal accelerations. Threat manager 810 can predict a location of probable impact on vehicle 110 based on the control barrier function, and the location of the moving object on the virtual sensing grid and a trajectory of the moving object. Threat manager 810 can predict a location of a probable impact on vehicle 110 and determine a vehicle path that moves the vehicle 110 to reduce the probability of impact within constraints indicated by the location of vehicle 110 with respect to surrounding objects and speed and directions in which vehicle 110 can move to evade impact.

In response to determining the threat level, threat manager 810 outputs impact data which is data regarding the location on vehicle 110 and an estimated severity of impact estimated based on the trajectory and size associated with the moving object. For example, threat manager 810 can label a moving object as "small" or "large" based on the number of data points occupied by the object in a virtual sensing grid 400. An estimated severity of impact can be estimated based on the location of impact on vehicle 110, the size of the moving object and the speed of the moving object. Impact data from threat manager 810 is output to accessories 816, which includes tail lights, head lights, horn, and memory included in computing device 115 to store data generated by threat manager 810 regarding detected moving objects. Threat manager 810 also outputs commands to vehicle control module 818 to control vehicle propulsion, steering and brakes to take evasive action. Further, threat manager can output impact data to communications 820 which directs computer 115 to transmit a message to server computer 120 via network 130 including data regarding a possible impact.

Figure 9:
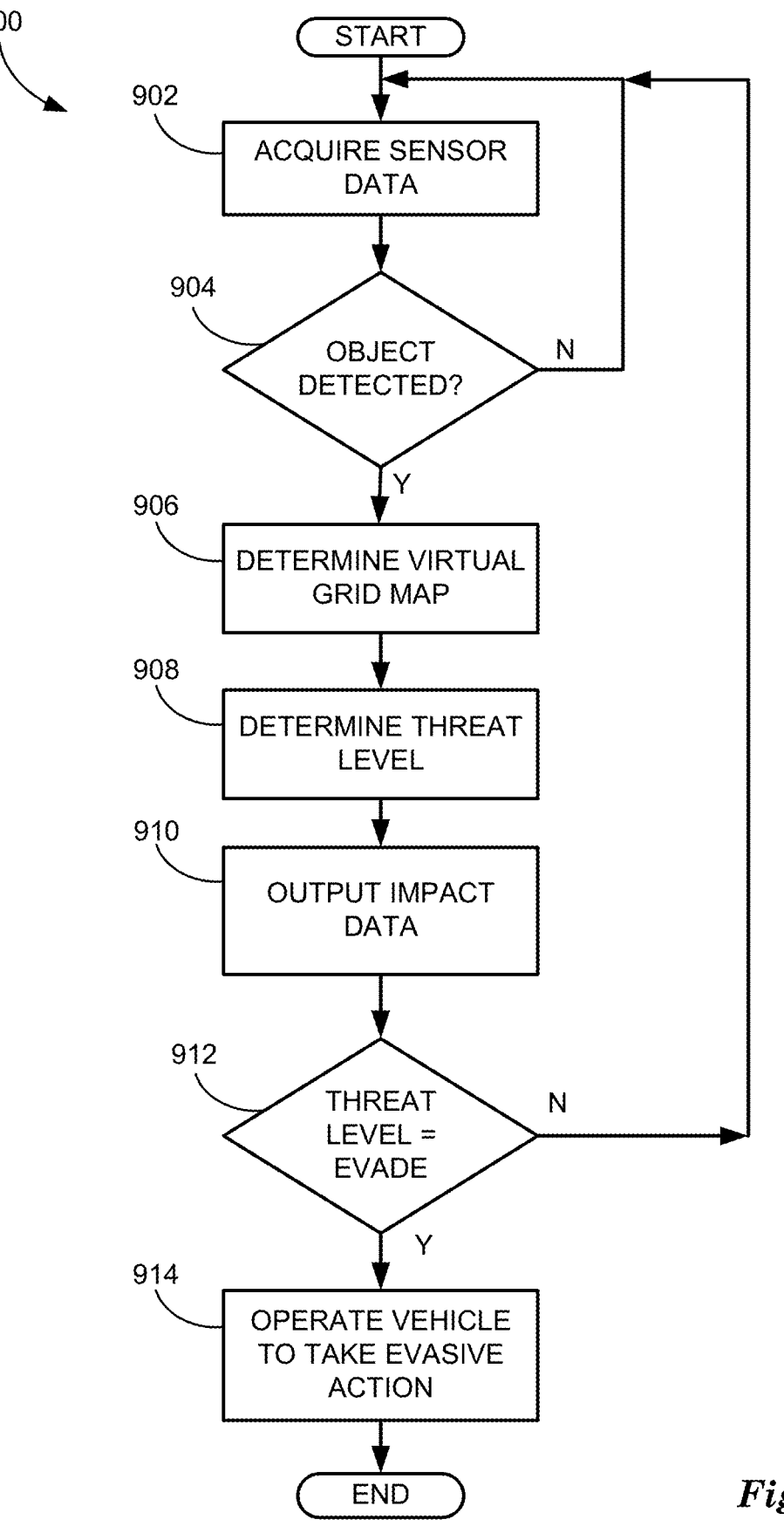
FIG. 9 is a flowchart diagram of example vehicle impact detection.

FIG. 9 is a flowchart of a process 900 for performing light impact detection. Process 900 can be implemented in a computing device 115 in a vehicle 110, for example. Process 900 includes multiple blocks that can be executed in the illustrated order. Process 900 could alternatively or additionally include fewer blocks, and/or can include the blocks executed in different orders.

Process 900 begins at block 902, where vehicle 110, which includes a computer 115 800, is in a key-off state, possibly parked. Computer 115 800 is in an idle state, where a subset of sensors 116 included in vehicle 110 are activated and acquire data from an environment around vehicle 110.

At block 904 sensor data is passed to local environment model 806 and perception interface 808. If local environment model 806 and perception interface 808 determine that a moving object is not included in the sensor data, process 900 returns to block 902 to acquire more sensor data. When sensor data includes a vehicle, process 900 passes to block 906.

At block 906, a moving object has been detected. local environment model 806 and perception interface 808 construct a virtual sensing grid 400 and determine a trajectory for the moving object.

At block 908 a virtual grid map and object trajectory are passed to threat manager 810 to determine a threat level based on the moving object's location and trajectory and a control barrier function.

At block 910, based on the threat level, threat manager 810 outputs appropriate impact data to accessories 816, vehicle control module 818, and communications 820 as described in relation to FIGS. 5-8, above, which distributes impact data to accessories 816 and first notice of liability 820.

At block 912, when the threat level is equal to evade, process 900 passes to block 914 to take evasive action. When the threat level is not equal to evade process 900 returns to acquire more data from sensors 116.

At block 914, threat manager 810 outputs vehicle control data to vehicle control module 818 to control vehicle propulsion, steering and brakes to take evasive action. Following block 914 process 900 ends.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:
1. A system, comprising:
a computer that includes a processor and a memory, the memory including instructions executable by the processor to:
determine a location and a trajectory of a moving object with respect to a stationary vehicle based on one or more first stationary vehicle sensors;
determine a threat level based on the location and the trajectory of the moving object, and a control barrier function based on curvature of a control barrier line, a lateral distance of the moving object to the stationary vehicle perpendicular to a direction of travel of the moving object, and a longitudinal distance to the stationary vehicle parallel to the direction of travel of the moving object; and based on the threat level, operate the stationary vehicle to move the stationary vehicle to reduce a probability of impact between the stationary vehicle and the moving object.

2. The system of claim 1, the instructions including further instructions to determine the probability of impact based on the control barrier function, the location of the moving object and the trajectory of the moving object.

3. The system of claim 1, wherein the threat level includes an idle state, an aware state, a warning state, and an evade state, wherein the idle state includes no probability of impact, the aware state includes a low probability of impact, the warning state includes a moderate probability of impact and the evade state includes a high probability of impact.

4. The system of claim 1, wherein the stationary vehicle is one or more of parked, in a key-off state, and unoccupied.

5. The system of claim 1, the instructions including further instructions to operate the stationary vehicle by controlling one or more of vehicle propulsion, vehicle steering, and vehicle brakes.

6. The system of claim 1, the instructions including further instructions to acquire first stationary vehicle sensor data periodically and combine the first stationary vehicle sensor data into a virtual sensor grid.

7. The system of claim 1, the instructions including further instructions to determine the trajectory of the moving object using a Kalman filter based on determining two or more locations of the moving object.

8. The system of claim 1, the instructions including further instructions to activate second stationary vehicle sensors based on the threat level.

9. The system of claim 1, the instructions including further instructions to predict a location of impact on the stationary vehicle based on the control barrier function.

10. The system of claim 1, the instructions including further instructions to activate one or more lights included in the stationary vehicle based on the threat level.

11. The system of claim 1, the instructions including further instructions to perform one or more of flashing a vehicle light and sounding a vehicle horn based on the threat level.

12. The system of claim 1, the instructions including further instructions to determine an evasive distance around the stationary vehicle within which to operate the stationary vehicle to reduce the probability of impact without increasing the probability of impacting an object in an environment around the stationary vehicle.

13. The system of claim 1, wherein the moving object is a second vehicle.

14. A method comprising:

determining a location and a trajectory of a moving object with respect to a stationary vehicle based on one or more first stationary vehicle sensors;

determining a threat level based on the location and the trajectory of the moving object, and a control barrier function based on curvature of a control barrier line, a lateral distance of the moving object to the stationary vehicle perpendicular to a direction of travel of the moving object, and a longitudinal distance to the stationary vehicle parallel to the direction of travel of the moving object; and based on the threat level, operating the stationary vehicle to move the stationary vehicle to reduce the probability of impact between the stationary vehicle and the moving object.

15. The method of claim 14, further comprising determining the probability of impact based on the control barrier function, the location of the moving object and the trajectory of the moving object.

16. The method of claim 14, wherein the threat level includes an idle state, an aware state, a warning state, and an evade state, wherein the idle state includes no probability of impact, the aware state includes a low probability of impact, the warning state includes a moderate probability of impact and the evade state includes a high probability of impact.

17. The method of claim 14, wherein the stationary vehicle is one or more of parked, in a key-off state, and unoccupied.

18. The method of claim 14, further comprising operating the stationary vehicle by controlling one or more of vehicle propulsion, vehicle steering, and vehicle brakes.

19. The method of claim 14, further comprising acquiring first stationary vehicle sensor data periodically and combining the first stationary vehicle sensor data into a virtual sensor grid.

20. The method of claim 14, further comprising determining the trajectory of the moving object using a Kalman filter based on determining two or more locations of the moving object.

* * * * *